United States Patent

Larsen et al.

Patent Number: 5,855,186
Date of Patent: Jan. 5, 1999

[54] SANITIZATION SYSTEM FOR CAT LITTER BOXES

[75] Inventors: Knut H. Larsen; Ashley L. Larsen, both of Alta Loma; Deborah L. Demelo, Ontario, all of Calif.

[73] Assignee: Ashley Products Corporation, San Dimas, Calif.

[21] Appl. No.: 886,586

[22] Filed: Jul. 1, 1997

Related U.S. Application Data

[63] Continuation-in-part of Ser. No. 678,993, Jul. 12, 1996, Pat. No. 5,775,258.

[51] Int. Cl.$^6$ .................................................. A01K 1/035
[52] U.S. Cl. ............................................ 119/166; 294/1.3
[58] Field of Search ................................. 119/161, 165, 119/166, 170, 167, 168; 294/1.3, 1.4, 1.5, 55; 209/614, 418, 419; 220/735, 697, 699

[56] References Cited

U.S. PATENT DOCUMENTS

| | | | |
|---|---|---|---|
| 4,771,501 | 9/1988 | Leiter | 15/104.92 |
| 4,926,794 | 5/1990 | Yamamoto | 119/165 |
| 5,076,627 | 12/1991 | Simon | 294/1.3 |
| 5,134,974 | 8/1992 | Houser | 119/168 |
| 5,297,695 | 3/1994 | Provence | 220/697 |

*Primary Examiner*—Robert P. Swiatek
*Assistant Examiner*—James S. Bergin
*Attorney, Agent, or Firm*—Frederick Gotha

[57] ABSTRACT

A sanitization system for cat litter boxes is presented which is composed of a scoop device for straining cat litter where the scoop device has a handle member from which a scoop region extends axially. At a predetermined distance axially from the scoop region, a containment member extends laterally of the handle where the containment member has a multiplicity of venting orifices extending therethrough. A fluid reservoir is removably attachable to the cat litter box. The fluid reservoir is defined by a housing having an open end and a cavity chamber where the cavity chamber is so dimensioned and constructed to be in fluid communication with the open to permit the passage of fluid through the open end. A deodorizing and disinfectant fluid is carried in the reservoir. To seal the reservoir, the dimensions of the open end of the reservoir and of the containment member are substantially identical such that when the scoop is stored in the reservoir the containment member will seal it and permit deodorizing vapors to escape through the orifices. The system also includes a plastic bag holder which is defined by a frame having a multiplicity of suspension members from which the plastic bag may be suspended.

23 Claims, 8 Drawing Sheets

SANITIZATION SYSTEM FOR CAT LITTER BOXES

This is a Continuation-in-part of U.S. application Ser. No. 08/678,993 filed Jul. 12, 1996, now U.S. Pat. No. 5,775,258.

FIELD OF THE INVENTION

This invention relates to a sanitization system for cat litter boxes which provides for the removal of cat fecal matter, continuous deodorization, and ready-waste disposal.

BACKGROUND OF THE INVENTION

Cat fecal matter has been traditionally removed from litter boxes by the use of a scoop through which the matter is strained. To remove the fecal matter, the straining end of the scoop is inserted into the litter beneath the fecal matter and then lifted to permit the litter to strain through. The fecal matter is thereafter disposed of by direct deposit into the household waste removal system or by depositing the matter into a container for ultimate placement with garbage disposal. Although there are many types of cat litter which act to deodorize the odor associated with litter box usage and sanitize the environment, the litter scoop in the removal of the fecal matter may become contaminated with causative agents of virucital activity. Such usage enhances the probability of the spread of infection.

It is therefore desirable to provide a system which not only disinfects the litter scoop but also deodorizes the environment of a litter box. The system may also provide a ready means to dispose of the cat fecal matter, particularly in those communities where direct deposit of the matter into the household waste system is prohibited by law.

SUMMARY OF THE INVENTION

The present invention is directed to a sanitation system for cat litter boxes where the system disinfects the litter scoop, provides deodorization of the litter box environment and supplies disposal bags for ready containment of the cat fecal matter which is thereafter deposited in the waste removal or garbage removal system of the household.

The sanitization system for cat litter boxes of this invention has a litter box scoop, a removably mounted litter box disinfectant and deodorizing fluid reservoir containing a disinfectant deodorization fluid, and a frame member which may be removably mounted to the cat litter box for holding plastic bags into which the cat fecal matter may be deposited. The litter box scoop has a handle member which has an axis of elongation and a scoop region extending axially from the end of the handle. The scoop region has an opening which is so dimensioned and proportioned to permit the litter to be strained therethrough. A containment member extends symmetrically and laterally of the handle member and is located a predetermined distance axially from the scoop region. A multiplicity of axially extending orifices extend through the containment member to act as vents such that fluid or vapor may pass through the containment member. To provide for sanitization of the litter box scoop, a removably mounted litter box disinfectant fluid reservoir is utilized. The disinfectant fluid reservoir has a housing which has an open end and a cavity chamber contained within the housing where the open end communicates with the cavity. The cavity is sealingly bounded by the housing such that disinfectant fluid contained within the reservoir will be sealingly retained within the housing and so dimensioned and constructed to permit the passage of fluid through the open end.

One embodiment of the disinfectant fluid reservoir is a rectangular box-like structure having thin sidewalls bounding the reservoir chamber. The reservoir chamber is so dimensioned and proportioned to receive the scoop region of the litter box scoop device for removable captive containment within the reservoir. An attachment member extends from the housing to permit removable mounting of the fluid reservoir to the cat litter box. After attachment, the reservoir is positioned to retain the disinfectant and deodorizing fluid and to captively accept the scoop region of the litter box scoop device. The containment member of the scoop device and the open end of the housing have like dimensions which permits the containment member to act as a seal of the reservoir chamber. Upon vaporization, the disinfectant and deodorization fluid is permitted to pass through the orifices in the containment member and thus promote deodorization of the litter box environment. The system further includes a bag holder which has a frame and a multiplicity of suspension members carried by the frame. The suspension members extend therefrom from which a bag may be suspended. An attachment member extends from the frame for removably mounting the frame to the litter box.

Another embodiment of the fluid reservoir has a multiplicity of suspension members for suspending the plastic bags extending from the front wall of the fluid reservoir and a first storage region carried by a sidewall of the fluid reservoir and a second storage region carried by a sidewall of the fluid reservoir. The first storage region is so dimensioned and proportioned to permit the storage of plastic bags and the second storage region is so dimensioned and proportioned to permit the storage of ties for the plastic bags.

Yet another embodiment of the scoop device of this invention again has a handle member and a first end and a scoop region extending axially from the first end. A valve means is carried by the handle member adjacent the first end for controlling the flow of deodorizing fluid past the first end. The valve means is composed of a containment member which extends laterally of the handle and where the containment member has at least one venting conduit therein to permit the passage of deodorizing fluid past the first end. The venting conduit is contained in the lower surface of the containment member and has an opening in a lateral peripheral surface which forms a transition surface between the upper and lower surfaces of the containment member.

Another embodiment of the deodorizing and disinfectant fluid reservoir includes a valve seat which is carried by the housing adjacent the open end of the cavity chamber; the valve seat is so constructed and adapted such that the scoop device may be removably held within the housing such that the scoop region of the scoop device is positioned within the cavity and held in fluid communication with the disinfectant and deodorizing fluid stored in the cavity. In one embodiment of the fluid reservoir, the housing contains a pair of external axially extending clip slots for receiving removably mountable S-clips. The S-clips permit the housing to be removably attachable to a cat litter box. To stabilize the fluid reservoir, the housing carries a laterally extending stabilizing tab which compressibly bears against the cat litter box when the fluid reservoir is suspended from the litter box.

An object of the present invention, therefore, is to provide a litter box scoop device which may be sanitized by insertion into a disinfectant and deodorizing fluid contained within a litter box disinfectant fluid reservoir.

Another object of the present invention is to provide a litter box disinfectant fluid reservoir for containing a disinfectant and deodorizing fluid where the reservoir is removably mountable to a cat litter box.

Still another object of the present invention is to provide a plastic bag holder which is removably mountable to a cat litter box for supporting plastic bags into which cat fecal matter may be deposited and the bag thereafter removed for disposal.

A further object of this invention is to provide a system which is comprised of a litter box scoop device, a litter box disinfectant fluid reservoir, and a litter box plastic bag holder to permit the disinfecting of the litter box scoop device after use, deodorizing the litter box environment, and allowing for ready removal of the cat fecal matter into plastic bags.

BRIEF DESCRIPTION OF THE DRAWINGS

These and other features and advantages will become appreciated as the same become better understood with reference to the following specification, claims and drawings wherein:

DETAILED DESCRIPTION

Figure 1:
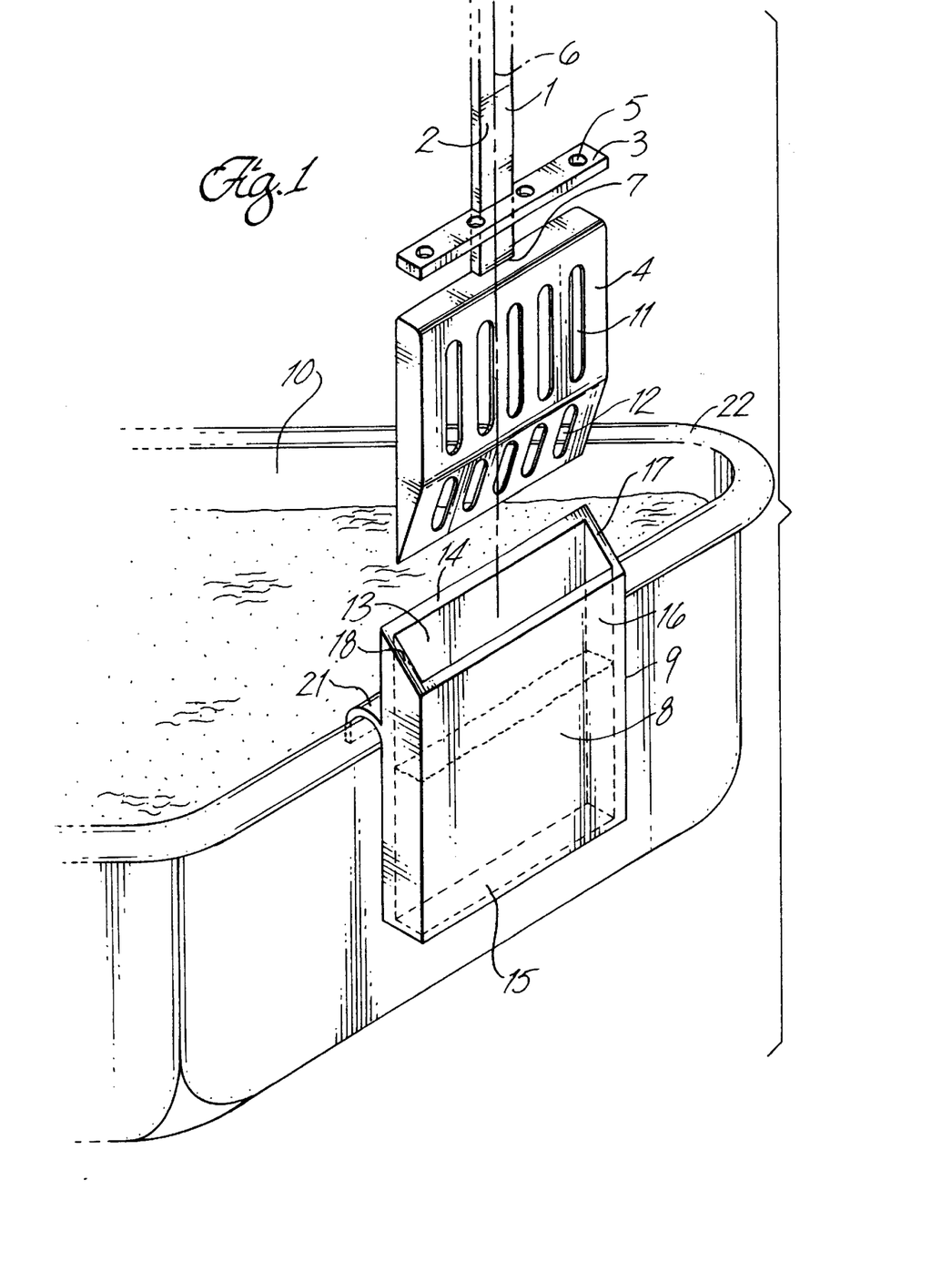
FIG. 1 is a perspective view of the litter scoop device and disinfectant fluid reservoir of this invention.

The sanitation system for a cat litter box of this invention is shown in perspective in FIG. 1 and has a scoop device 1 which is composed of a handle member 2, a containment member 3 and a scoop region 4. Handle member 1 has an axis of elongation 6 and a first end 7 where the scoop region 4 extends axially from first end 7. As can be seen in FIG. 1, containment member 3 is a thin flat plate which extends laterally of the handle 1. The purpose of containment member 3 is to form a seal over the disinfectant and deodorizing fluid 8 retained by the disinfectant fluid reservoir 9. In order to permit deodorizing vapors to escape from reservoir 9, containment member 3 has a multiplicity of axially extending orifices 5 that extend through the containment member. These orifices allow evaporated deodorizing fluid to pass into the litter box cavity 10 environment.

The scoop region 4 of the scoop device has a plurality of axially extending openings 11 which are substantially parallel to each other and a second multiplicity of openings 12 which are also substantially parallel to each other for straining the cat litter after the cat fecal matter is scooped from the litter box. The scoop region 4 is so dimensioned and proportioned to permit insertion into the cavity 13 of the disinfectant fluid reservoir 9.

Figure 2:
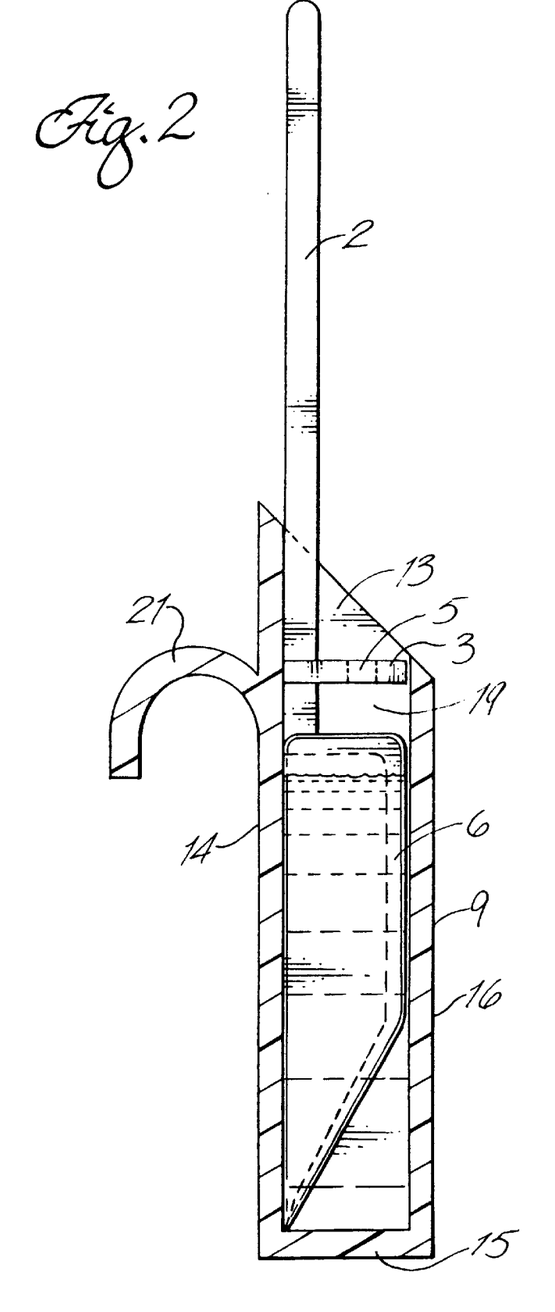
FIG. 2 is a cross-sectional view of the disinfectant fluid reservoir with the litter box scoop device inserted and held therein.

By referring to FIGS. 1 and 2, it can be seen that disinfectant fluid reservoir 9 is a box-like structure having a rear wall 14, a bottom plate 15, and a front wall 16, and sidewalls 17 and 18 which form the boundary of cavity 13 and define a reservoir or cavity chamber 19.

It is desirable to have disinfectant fluid reservoir mounted to the cat litter box to permit the deodorizing action of the disinfectant and deodorizing fluid 8 to continuously deodorize the environment of the litter box. In one embodiment to this invention, therefore, the disinfectant fluid reservoir has an arcuate attachment member 21 extending from rear wall 14 which allows engagement of the disinfectant fluid reservoir 9 with peripheral lip 22 of the cat litter box. Since there are many designs for cat litter boxes, the attachment of the reservoir to the litter box may be provided by other simple attachments well known in the prior art. Additionally, the litter box itself may be a construction where the reservoir is integrally part of it.

Figure 3:
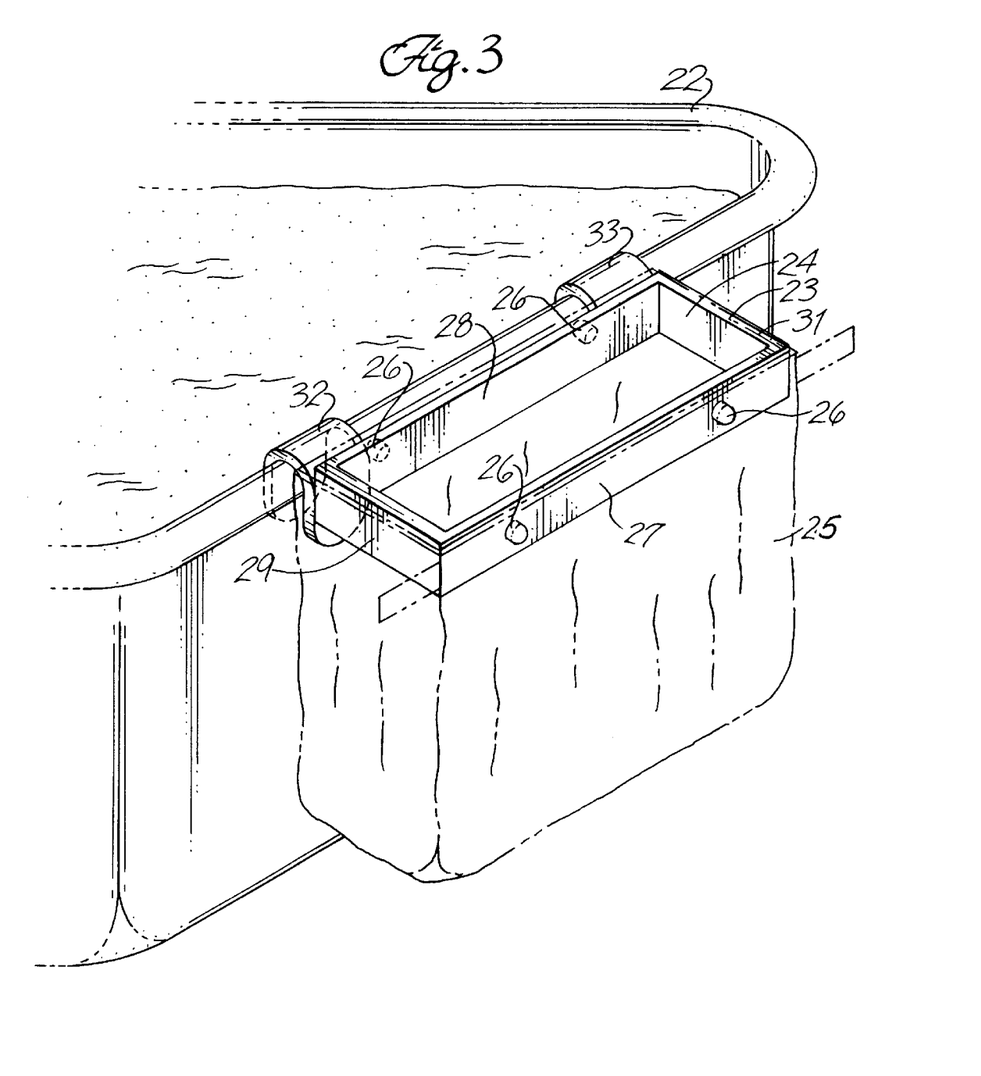
FIG. 3 is a perspective view of the bag holder portion of the system of this invention removably attached to a cat litter box.

Referring now to FIG. 3, a bag holder 23 is illustrated for supporting plastic bags 25 into which cat fecal matter may be deposited after removal from the litter box. As can be see in FIG. 3, bag holder 23 is composed of a frame member 24 having suspension pegs 26 projecting therefrom from which plastic bag 25 may be suspended. Frame member 24 in one embodiment of this invention may be a rectangular frame as illustrated in FIG. 3 with a front slat 27, a rear slat 28 and side slats 29 and 31. To suspend the frame from the litter box, a pair of arcuate attachment members 32 and 33 are carried by rear slat 28 for engagement with the peripheral lip 22 of the cat litter box. Although in the embodiment shown in FIG. 3 the frame 24 is rectangular, it will be appreciated that the frame may be of any shape so long as the shape permits the plastic bag to be suspended therefrom. For instance, a triangular shaped frame having a base slat and slide slats with suspension members associated therewith for suspending the bag may also be used. Additionally, the frame may be attached to the litter box in a removable manner or it may be integrally formed with the litter box.

Although not shown in the drawings, fluid reservoir 9 may have a multiplicity of suspension members for suspending plastic bags externally anteriorly of front wall 16 and a first storage region extending from a sidewall 17 so dimensioned and proportioned to permit the storage of plastic bags therein; and a second storage region extending from a sidewall 18 so dimensioned and proportioned to permit the storage of plastic bag ties.

Referring now to FIGS. 1 and 2, it can be seen that the sanitation system of this invention incorporates a scoop device 1 and a disinfectant reservoir container 9 where the reservoir contains a disinfectant and deodorizing fluid. After the scoop is used to remove cat fecal matter it can then be inserted and is captively held by the disinfectant fluid reservoir where the scoop region 4 is disinfected and the reservoir is sealed by the containment member 3 extending from the handle of the scoop device. A disinfectant solution is preferred which exhibits effective virucital activity against infectious strains which may be contained in cat fecal matter or other diseases which may be carried by the scoop region of the scoop device.

Figure 4:
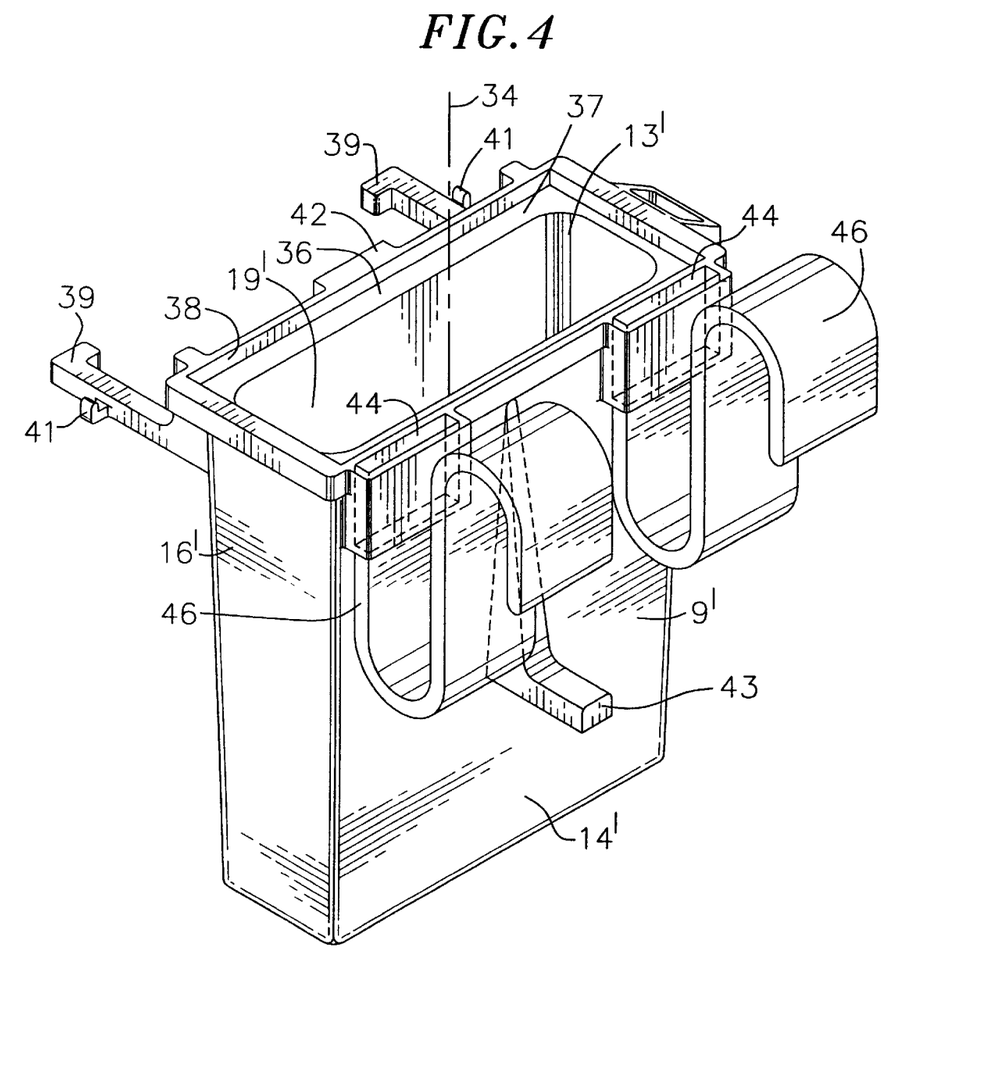
FIG. 4 is a perspective view of an embodiment of the fluid reservoir of this invention.

FIG. 4 illustrates a preferred embodiment of the fluid reservoir container 9'. As can be seen in FIG. 4, fluid reservoir 9' has a cavity 13' and a reservoir chamber 19' and a vertical axis 34. The cavity chamber 19' and cavity 13' are identically bounded by the reservoir container 9'. At the opening or mouth 36 of the cavity 13' a peripherally extending flange 37 forms a valve seat for containment member 3 of the scoop device. A circumferential wall 38 extends axially from peripherally extending flange 37 for removably and captively holding the containment member. As can further be seen in FIG. 4, the reservoir container 9' has a front wall 16' from which a pair of bag suspension arms 39 extend laterally of the vertical axis 34 where each bag suspension arm contains a hook 41 from which the bag may be suspended when the cat excrement is to be transferred from the cat litter box into the bag. A vertically extending spread tab 42 extends from the circumferential wall 38 vertically and creates a gap between the spread tab 42 and frontal wall 16'; the gap between the frontal wall and the tab allows one side of a bag to be held while the bag is spread open and then supported on hooks 41.

Referring again to FIG. 4, the rear wall 14' of reservoir container 9' carries a laterally extending stabilizing tab 43. A pair of S-clips 46 which are insertable into clip-slots 44 and permit the fluid reservoir to be suspended from the peripheral lip 22 of the litter box. When the fluid reservoir is suspended by S-clips 46 from the litter box, stability of the reservoir in the suspended position is achieved by stabilization tab 43 bearing in compression against the side of the cat litter box.

Figure 5:
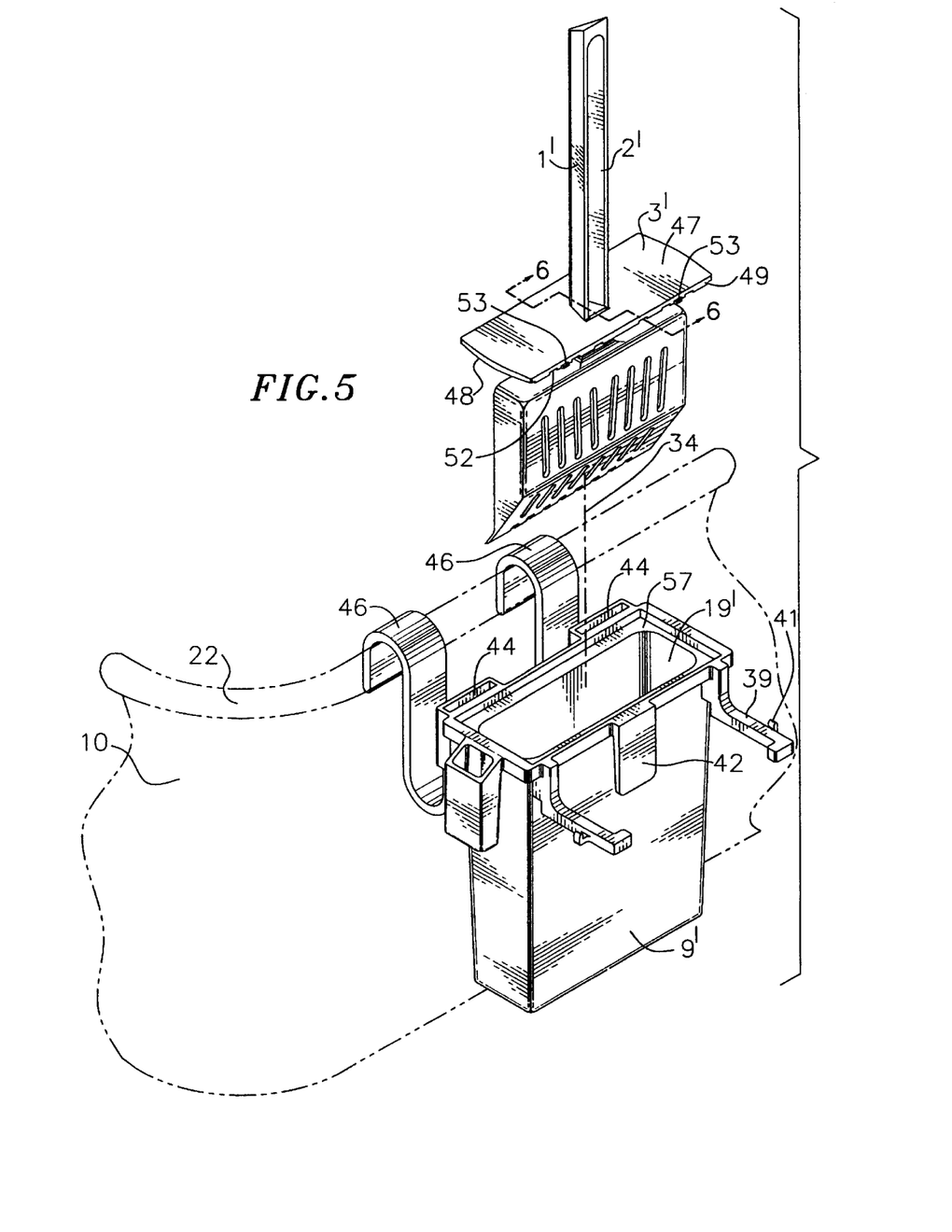
FIG. 5 is a perspective view of an embodiment of the scoop device of this invention in combination with the fluid reservoir device illustrated in FIG. 4.
Figure 6:
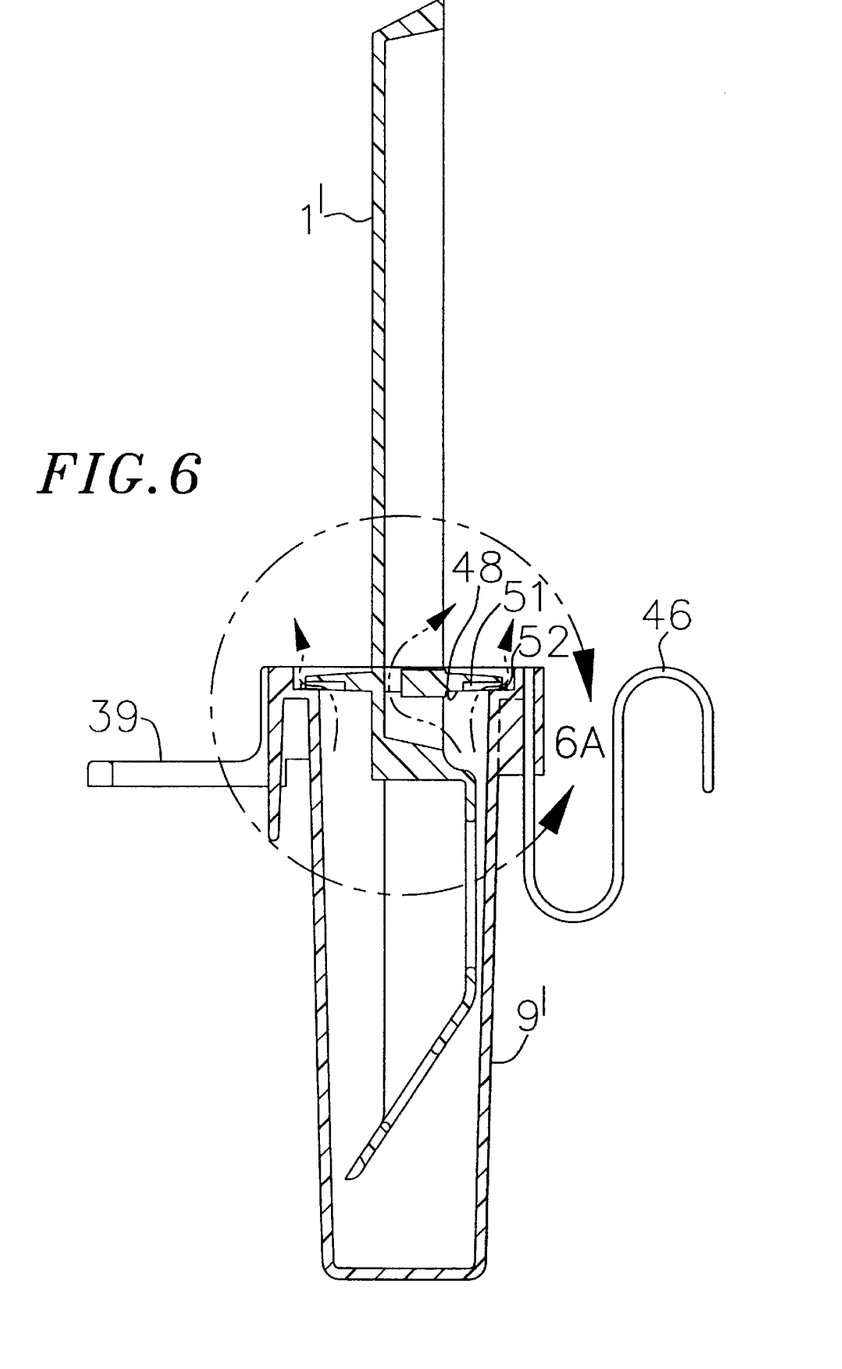
FIG. 6 is a cross-sectional view of the scoop device taken along line 6—6 of FIG. 5.
Figure 6A:
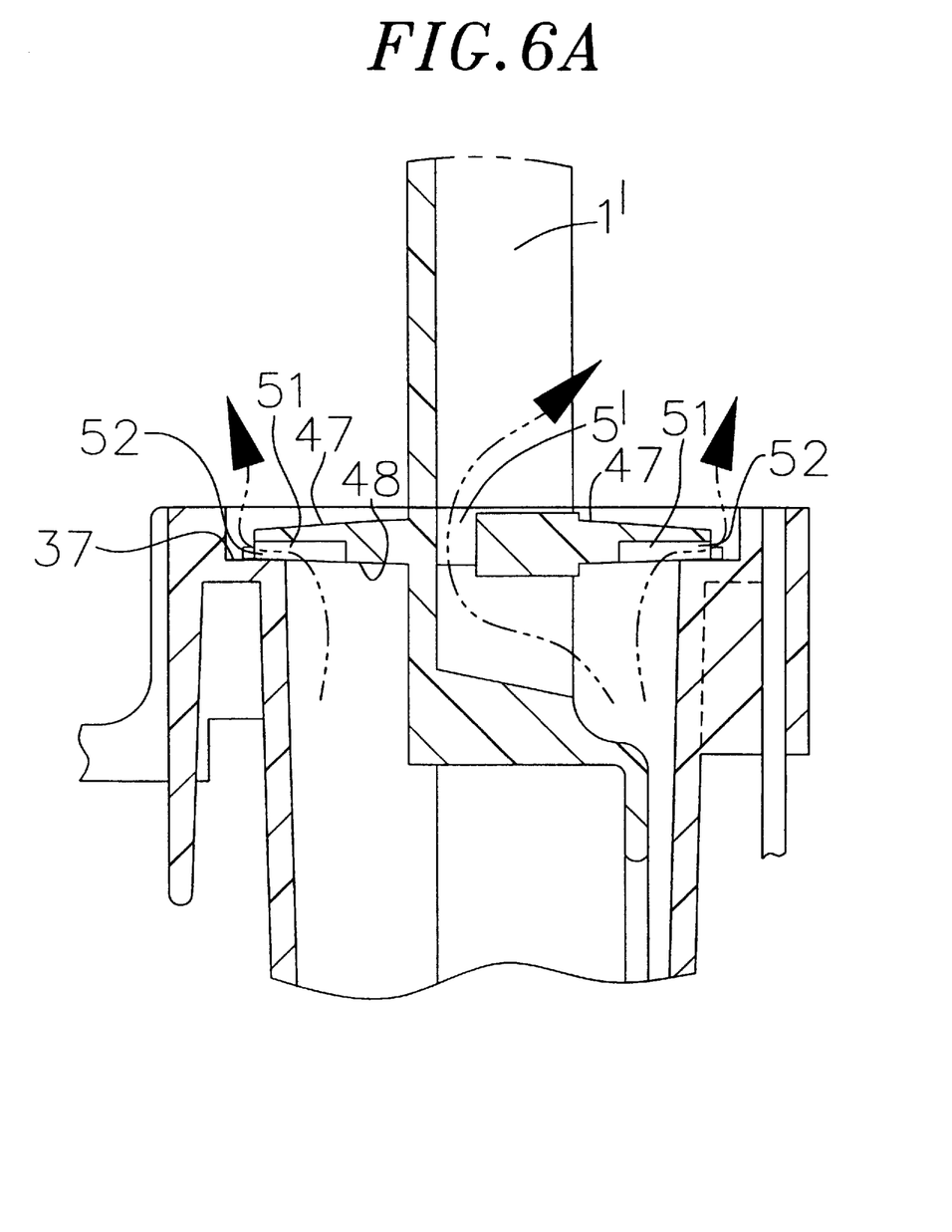
FIG. 6A is an exploded view of that part of FIG. 6 enclosed by the arcuate line 6A.

The sanitation system of the preferred embodiment of this invention is further illustrated in FIGS. 5, 6, and 6A. Referring to FIG. 5, the scoop device 1', having a handle member 2' and a containment member 3', is shown in a removed configuration from reservoir container 9'. The containment member 3' has a top surface 47 and a bottom surface 48 and a lateral peripheral surface 49 extending between top surface 47 and bottom surface 48. Containment member 3' when inserted into reservoir chamber 19' seats against peripherally extending flange 37 which can more clearly be seen in FIG. 6. The lower surface 48 of containment member 3' contains a multiplicity of venting conduits 51 which have openings 52 in the peripheral surface 49 of the containment member. Thus, evaporated deodorizing fluid is permitted to vent from the reservoir through venting conduit 51 and openings 52.

Figure 7:
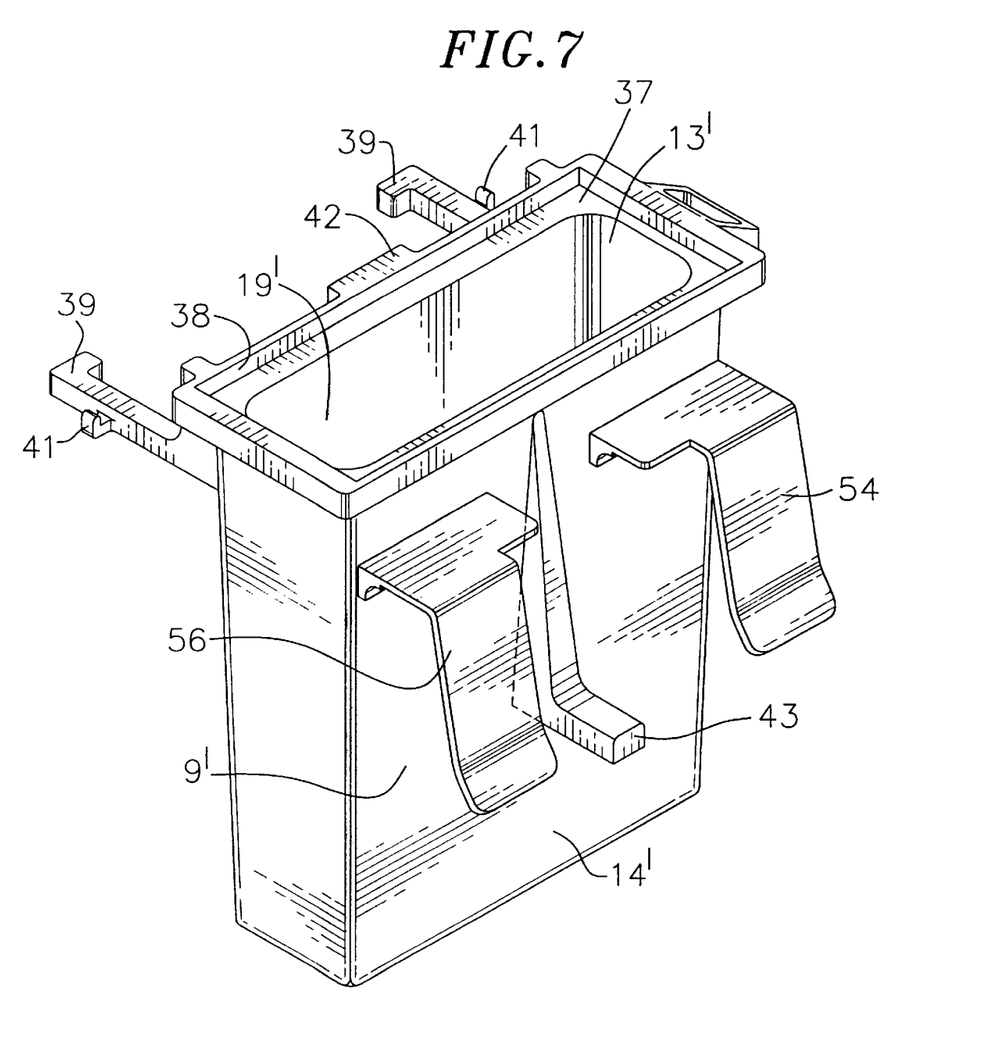
FIG. 7 is an illustration of another embodiment of the fluid reservoir.

Scoop device 1' may also contain an axial orifice 5' which is more clearly illustrated in FIG. 6A. In FIG. 6A, the flow of evaporated deodorizing fluid is more clearly illustrated and it can be seen that the bottom surface 48 of the containment member seats against peripherally extending flange 37; and the evaporated deodorizing fluid is in fluid communication with venting conduits 51 and conduit openings 52 to vent the deodorizing vapors into the cat litter box environment. The scoop device 1' may be captively held seated against peripheral flange 37 by friction tabs 53 (friction tabs are shown in FIG. 5). By referring to FIG. 7, another embodiment can be seen by which the reservoir container 9' is suspended from the peripheral lip 22 of a litter box. Like the preferred embodiment described above, the reservoir container 9' has a laterally extending stabilizer tab for stabilizing the reservoir container when attachment tabs 54 and 56 are slipped over the peripheral lip 22 of the cat litter box.

While I have shown and described a sanitization system for cat litter boxes, it is to be understood that the invention is subject to many modifications without departing from the scope and spirit of the claims as recited herein. This invention is not to be limited by the embodiment shown in the drawing and described in the description which is given by way of example and not of limitation.

What is claimed is:

1. A scoop device to control the flow of deodorizing fluid and for straining cat litter, comprising:

(a) a handle member having an axis of elongation and a first-end;

(b) a scoop region extending axially from said first-end of said handle member, said scoop region having an opening therein so dimensioned and proportioned to permit straining of said cat litter; and (c) a valve element carried by said handle member adjacent said first-end for controlling the flow of said deodorizing fluid past said first-end.

2. The scoop device recited in claim 1 where said valve element comprises a containment member extending laterally of said handle member where said containment member has at least one venting conduit therein to permit the passage of said deodorizing fluid past said first-end.

3. The scoop device recited in claim 2 where said containment member has a lateral peripheral surface having an opening in fluid communication with said venting conduit.

4. The scoop device recited in claim 3 where said containment member has a lower surface and an upper surface interconnected by said lateral peripheral surface and where said venting conduit is contained in said lower surface.

5. The scoop device recited claim 1 where said valve element comprises a containment member extending laterally of said handle member where said containment member has at least one venting conduit extending therethrough.

6. The scoop device recited in claim 5 where said containment member has a lower surface and an upper surface connected by said lateral peripheral surface, said lower and upper surface having openings therein communicating with said venting conduit.

7. A fluid reservoir having a vertical axis for deodorizing the environment of a cat litter box and for holding an animal waste matter scoop device comprising:

(a) a housing having an open end and a cavity chamber for storing said fluid and for holding said scoop device, where said open end and said cavity chamber are in fluid communication and said cavity chamber is so dimensioned and constructed to store said fluid and to hold said scoop device;

(b) a valve seat carried by said housing adjacent said open end and so constructed and adapted to removably hold said scoop device; and (c) attachment means associated with said housing for removably attaching said housing to said cat litter box.

8. The fluid reservoir recited in claim 7 further comprising a stabilizing tab extending laterally of said housing for bearing engagement with said cat litter box to stabilize said housing after said housing is attached to said cat litter box.

9. The fluid reservoir recited in claim 8 where said attachment means comprises a multiplicity of clip-slots carried by said housing externally of said cavity and adjacent said stabilizing tab, and a multiplicity of S-clips having an attachment end and an insertion end where said attachment end attaches to said cat litter box and said insertion end is removably insertable into said clip-slots.

10. The fluid reservoir recited in claim 7 further comprising support means carried by said housing for supporting cat excrement deposit bags.

11. The fluid reservoir recited in claim 10 further comprising a pair of extension arms extending laterally of said vertical axis for supporting said cat excrement deposit bags.

12. The fluid reservoir recited in claim 7 where said valve seat further comprises a peripheral flange extending laterally of said vertical axis and peripherally of said opening.

13. In combination:

(a) a scoop device to control the flow of deodorizing fluid and for straining cat litter comprising, a handle member having an axis of elongation and a first-end, a scoop region extending axially from said first-end of said handle member, said scoop region having an opening therein so dimensioned and proportioned to permit straining of said cat litter, and valve element carried by said handle member adjacent said first-end for controlling the flow of said deodorizing fluid past said first-end; and (b) a fluid reservoir for use with a cat litter box comprising a housing having a vertical axis and an open end and a cavity chamber, where said cavity chamber is so dimensioned and constructed to be in fluid communication with said open end, a valve seat carried by said housing adjacent said open end and so constructed and adapted to removably hold said scoop device, and attachment means carried by said housing for removably attaching said housing to said cat litter box.

14. The combination recited in claim 13 where said valve element comprises a containment member extending laterally of said handle member where said containment member has at least one venting conduit therein to permit the passage of said deodorizing fluid past said first-end.

15. The combination recited in claim 14 where said containment member has a lateral peripheral surface having an opening in fluid communication with said venting conduit.

16. The combination recited in claim 15 where said containment member has a lower surface and an upper surface connected by said lateral peripheral surface and where said venting conduit is contained in said lower surface.

17. The combination recited in claim 13 where said valve element comprises a containment member extending laterally of said handle member where said containment member has at least one venting conduit extending therethrough.

18. The combination recited in claim 17 where said containment member has a lower surface and an upper surface connected by said lateral peripheral surface, said lower and upper surfaces having openings therein in fluid communication with said venting conduit.

19. The combination recited in claim 13 where said fluid reservoir further comprises a stabilizer tab extending laterally of said housing for bearing engagement with said cat litter box to stabilize said housing after said housing is attached to said cat litter box.

20. The combination recited in claim 19 where said attachment means comprises a multiplicity of clip-slots carried by said housing externally of said cavity and adjacent said stabilizing tab, and a multiplicity of S-clips having an attachment end and an insertion end where said attachment end attaches to said cat litter box and said insertion end is removably insertable into said clip-slots.

21. The combination recited in claim 13 further comprising support means carried by said housing for supporting cat excrement deposit bags.

22. The combination recited in claim 21 further comprising a pair of extension arms extending laterally of said vertical axis for supporting said cat excrement deposit bags.

23. The combination recited in claim 13 where said valve seat further comprises a peripheral flange extending laterally of said vertical axis and peripherally of said opening.

* * * * *